United States Patent
Kim et al.

(10) Patent No.: US 12,503,803 B2
(45) Date of Patent: Dec. 23, 2025

(54) CLOTHES TREATING APPARATUS

(71) Applicants: SAMSUNG ELECTRONICS CO., LTD., Suwon-si (KR); Inha University Research and Business Foundation, Incheon (KR)

(72) Inventors: Doyeon Kim, Suwon-si (KR); Seungbok Choi, Incheon (KR); Hyungjin Choe, Suwon-si (KR); Byunghyuk Kang, Incheon (KR); Jeonghoon Kang, Suwon-si (KR); Bogyu Kim, Pohang-si (KR); Yujin Park, Incheon (KR); Jaeik Park, Suwon-si (KR); Junhyeong Park, Suwon-si (KR); Sejun Lee, Suwon-si (KR)

(73) Assignees: SAMSUNG ELECTRONICS CO., LTD., Suwon-si (KR); INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 183 days.

(21) Appl. No.: 18/209,870

(22) Filed: Jun. 14, 2023

(65) Prior Publication Data
US 2024/0018712 A1 Jan. 18, 2024

Related U.S. Application Data

(63) Continuation of application No. PCT/KR2023/006149, filed on May 4, 2023.

(30) Foreign Application Priority Data

Jul. 13, 2022 (KR) .......................... 10-2022-0086558

(51) Int. Cl.
*D06F 37/22* (2006.01)
*F16F 7/09* (2006.01)
(Continued)

(52) U.S. Cl.
CPC ............ *D06F 37/22* (2013.01); *D06F 37/225* (2013.01); *F16F 7/09* (2013.01); *F16F 9/14* (2013.01); *F16F 9/53* (2013.01); *F16F 9/535* (2013.01)

(58) Field of Classification Search
CPC .......... D06F 37/22; D06F 37/225; F16F 7/09; F16F 9/14; F16F 9/53; F16F 9/535
See application file for complete search history.

(56) References Cited

U.S. PATENT DOCUMENTS

| | | |
|---|---|---|
| 6,279,700 B1 | 8/2001 | Lisenker et al. |
| 8,387,420 B2 | 3/2013 | Kawabata et al. |

(Continued)

FOREIGN PATENT DOCUMENTS

| | | | | |
|---|---|---|---|---|
| CN | 102808304 A | * | 12/2012 | ............. D06F 37/22 |
| CN | 104278484 A | * | 1/2015 | ............. D06F 37/22 |

(Continued)

OTHER PUBLICATIONS

Machine translation of CN 102808304 A to Yamaguchi et al. (Year: 2012).*

(Continued)

*Primary Examiner* — Joseph L. Perrin
(74) *Attorney, Agent, or Firm* — STAAS & HALSEY LLP

(57) ABSTRACT

A clothes treating apparatus includes: a cabinet; a tub positioned inside the cabinet; a drum configured to rotate inside the tub; and a damper coupled to the cabinet and the tub and configured to reduce vibrations of the tub according to a rotation of the drum. The damper includes: a piston; a (Continued)

cylinder forming an inside space in which the piston is movable, the cylinder including a yoke and a bobbin positioned at one side of the yoke; and a friction member positioned between an outer surface of the piston and an inner surface of the cylinder and including a magnetorheological fluid of which viscosity changes according to a magnetic field. A thickness of the friction member positioned between the piston and the bobbin is smaller than a thickness of the friction member positioned between the piston and the yoke.

15 Claims, 9 Drawing Sheets

(51) Int. Cl.
  *F16F 9/14* (2006.01)
  *F16F 9/53* (2006.01)

(56) References Cited

U.S. PATENT DOCUMENTS

| | | | |
|---|---|---|---|
| 8,757,335 | B2 | 6/2014 | Kaneda et al. |
| 8,857,247 | B2 | 10/2014 | Shiga |
| 2011/0289981 | A1* | 12/2011 | Kawabata ............... D06F 37/20 68/131 |
| 2013/0042492 | A1* | 2/2013 | Nishimura ............... D06F 37/22 68/23.1 |
| 2013/0042654 | A1* | 2/2013 | Kaneda ................... D06F 37/20 68/19 |
| 2013/0081433 | A1* | 4/2013 | Shiga ..................... F16F 9/535 68/3 R |

FOREIGN PATENT DOCUMENTS

| | | | |
|---|---|---|---|
| JP | 2006-57766 | | 3/2006 |
| JP | 5349201 | | 11/2013 |
| KR | 10-2011-0101242 | | 9/2011 |
| KR | 10-2012-0029999 | | 3/2012 |
| KR | 20-0459493 | | 4/2012 |
| KR | 10-2012-0122539 | | 11/2012 |
| KR | 10-1197309 | | 11/2012 |
| KR | 10-2013-0002114 | | 1/2013 |
| KR | 20130024832 A | * | 3/2013 |
| KR | 10-2013-0073665 | | 7/2013 |
| KR | 10-2014-0029129 | | 3/2014 |
| KR | 10-1411148 | | 6/2014 |
| KR | 10-1412935 | | 7/2014 |
| KR | 10-1472011 | | 12/2014 |
| KR | 10-1757434 | | 7/2017 |
| KR | 10-1757435 | | 7/2017 |
| KR | 10-1984633 | | 5/2019 |
| KR | 10-2098882 | | 4/2020 |
| KR | 10-2244520 | | 4/2021 |
| KR | 10-2290868 | | 8/2021 |

OTHER PUBLICATIONS

Machine translation of CN 104278484 A to Kawabata et al. (Year: 2015).*
Machine translation of KR 2013-0024832 A to Izawa et al. (Year: 2013).*
Machine translation of KR 101472011 B1 to Kim et al. (Year: 2014).*
International Search Report dated Aug. 18, 2023 issued in PCT Application No. PCT/KR2023/006149.
Written Opinion dated Aug. 18, 2023 issued in PCT Application No. PCT/KR2023/006149.
Supplementary European Search Report dated May 22, 2025 issued in European Application No. EP 23 83 9768.

* cited by examiner

CLOTHES TREATING APPARATUS

CROSS-REFERENCE TO RELATED APPLICATIONS

This application is a continuation application, filed under 35 U.S.C. § 111(a), of International Application PCT/KR2023/006149 filed on May 4, 2023, and is based on and claims priority under 35 U.S.C. § 119 to Korean Patent Applications No. 10-2022-0086558, filed on Jul. 13, 2022, in the Korean Intellectual Property Office. The disclosure of which is incorporated by reference herein in its entirety.

BACKGROUND

Field

The present disclosure relates to a clothes treating apparatus, and more particularly, to a clothes treating apparatus including an improved damper.

Description of the Related Art

In general, clothes treating apparatuses include a washing machine for washing clothes put into the drum through friction by rotating the clothes together with a detergent by using a driving force of the motor, and a dryer for drying objects to be dried by rotating the drum in which the objects are accommodated.

A washing machine as an example of a clothes treating apparatus may include a cabinet forming an appearance, a tub accommodating washing water, and a drum accommodating laundry and rotatably provided inside the tub. Also, the washing machine may include dampers for attenuating vibrations and shaking generated in the tub while supporting the tub.

Recently, dampers including a magneto-rheological fluid are used. The magneto-rheological fluid changes in viscosity in response to a magnetic field, and a damping force may change according to a change of viscosity. For example, it may be possible to increase a damping force for a low-speed vibration period and increase a damping force for a high-speed vibration period.

However, due to a high price of the magneto-rheological fluid, there is a demand for dampers having an excellent damping force while using a small amount of magneto-rheological fluid.

SUMMARY

A clothes treating apparatus according to an embodiment of the disclosure includes: a cabinet; a tub positioned inside the cabinet; a drum configured to rotate inside the tub; and a damper coupled to the cabinet and the tub and configured to reduce vibrations of the tub according to a rotation of the drum, wherein the damper includes: a piston; a cylinder forming an inside space in which the piston is movable, the cylinder including a yoke and a bobbin positioned at one side of the yoke; and a friction member positioned between an outer surface of the piston and an inner surface of the cylinder, the friction member including a magneto-rheological fluid of which viscosity changes according to a magnetic field, and wherein a thickness of the friction member positioned between the piston and the bobbin is smaller than a thickness of the friction member positioned between the piston and the yoke.

The cylinder may include a radial protrusion protruding from an inner surface of the bobbin forming the inside space to accommodate the friction member.

The cylinder may comprise a plurality of radial protrusions and the radial protrusion is one of the plurality of radial protrusions, a portion of the friction member may be positioned between the plurality of radial protrusions, and an other portion of the friction member may be positioned between the inner surface of the bobbin and an outer surface of the piston.

Each of the plurality of radial protrusions may include: a protrusion surface extending toward the outer surface of the piston; and a connecting surface connecting the protrusion surface to the inner surface of the bobbin.

A ratio between a thickness of a portion of the friction member accommodated between the protrusion surface and the outer surface of the piston and a thickness of another portion of the friction member accommodated between the inner surface of the bobbin and the outer surface of the piston may be 1:2.4.

The cylinder may further include the yoke, and a case accommodating the bobbin.

The bobbin may further include: a support plate extending in a radial direction of the bobbin to be in contact with the yoke; and an extension portion extending from the support plate along a longitudinal direction of the piston, wherein the plurality of radial protrusions are formed on the extension portion.

A radius length of the extension portion may be smaller than a radius length of the plurality of support plates, and the damper may further include a coil configured to surround an outer circumference of the extension portion and interwork with the friction member including the magneto-rheological fluid.

The plurality of radial protrusions may include: a first radial protrusion protruding from the inner surface of the bobbin along one direction; and a second radial protrusion protruding from the inner surface of the bobbin along a second direction that is opposite to the one direction.

The piston may include a radial protrusion protruding from the outer surface of the piston toward the inner surface of the bobbin.

The piston may comprise a plurality of radial protrusions and the radial protrusion is one of the plurality of radial protrusions, and a portion of the friction member may be positioned between the plurality of radial protrusions, and an other portion of the friction member may be positioned between the inner surface of the bobbin and the outer surface of the piston.

Each of the plurality of radial protrusions may include: a protrusion surface extending toward the inner surface of the bobbin; and a connecting surface connecting the protrusion surface to the outer surface of the piston.

The bobbin may further include: a support plate extending in a radial direction of the bobbin to be in contact with the yoke; and an extension portion extending from the support plate along a longitudinal direction of the piston, wherein a radius length of the extension portion is smaller than a radius length of the support plate, and the damper may further include a coil configured to surround an outer circumference of the extension portion and interwork with the friction member including the magneto-rheological fluid.

Each of the radial protrusions may include: a first radial protrusion protruding from the outer surface of the piston along one direction; and a second radial protrusion protruding from the outer surface of the piston along a direction that is opposite to the one direction.

A clothes treating apparatus according to an embodiment of the disclosure includes: a cabinet; a tub positioned inside the cabinet; a drum configured to rotate inside the tub; and a damper coupled to the cabinet and the tub and configured to reduce vibrations of the tub according to a rotation of the drum, the damper including a piston, a cylinder including an inside space in which the piston is movable and a radial protrusion protruding from an inner surface forming the inside space, and a friction member positioned between an outer surface of the piston and an inner surface of the cylinder and including a magneto-rheological fluid of which viscosity changes according to a magnetic field, wherein a thickness of a portion of the friction member positioned between the radial protrusion and the outer surface of the piston is smaller than a thickness of an other portion of the friction member positioned between the inner surface of the cylinder and the outer surface of the piston on which no radial protrusion is formed.

The thickness of the portion of the friction member and the thickness of the other portion of the friction member may be thicknesses in a radial direction of the piston.

A ratio between the thickness of the portion of the friction member and the thickness of the other portion of the friction member may be 1:2.4.

A clothes treating apparatus according to an embodiment of the disclosure includes: a cabinet; a tub positioned inside the cabinet; a drum rotatably provided inside the tub; and a damper coupled to the cabinet and the tub, wherein the damper includes: a case; a plurality of yokes positioned inside the case, each of the plurality of yokes including a cavity; a bobbin positioned between the plurality of yokes and including a cavity; a coil configured to surround an outer circumference of the bobbin; a piston being movable between the cavity of the plurality of yokes and the cavity of the bobbin, and including a radial protrusion protruding from an outer surface of the piston toward an inner surface of the bobbin; and a friction member including a magneto-rheological fluid of which viscosity changes according to a magnetic field, wherein a thickness of a portion of the friction member, accommodated between the radial protrusion and the inner surface of the bobbin is smaller than a thickness of another portion of the friction member, positioned between the inner surface of the bobbin and the outer surface of the piston on which no radial protrusion is formed.

The bobbin may further include: a plurality of support plates extending in a radial direction of the bobbin to be respectively in contact with the plurality of yokes; and an extension portion extending between the plurality of support plates to connect the plurality of support plates to each other, wherein a radius length of the extension portion is smaller than a radius length of the support plates, and the damper may further include a coil configured to surround an outer circumference of the extension portion and interwork with the friction member including the magneto-rheological fluid.

The radial protrusion may include a first radial protrusion protruding from the outer surface of the piston along one direction, and a second radial protrusion protruding from the outer surface of the piston along a direction that is opposite to the one direction.

DETAILED DESCRIPTION

Figure 1:
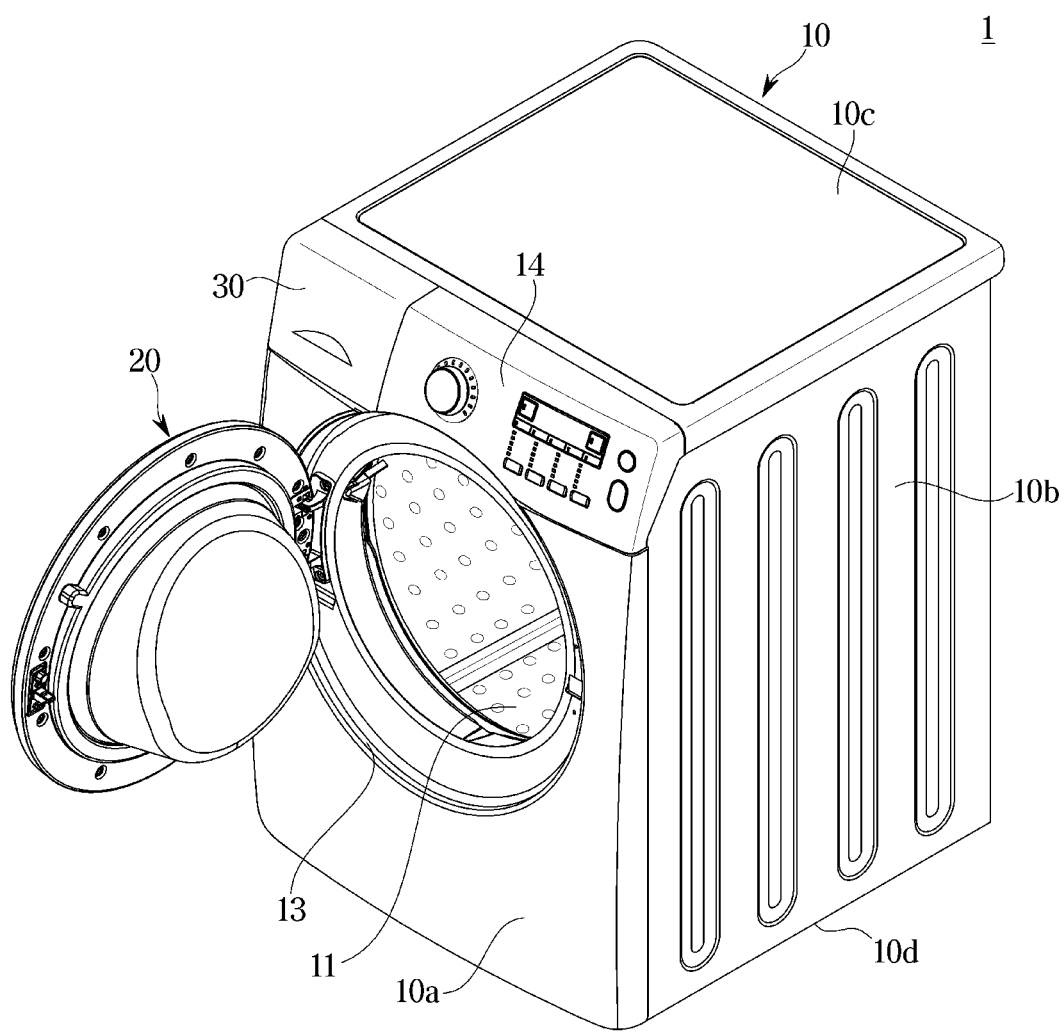
FIG. 1 is a perspective view of a clothes treating apparatus according to an embodiment of the disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

Meanwhile, in the following description, the terms "front", "rear", "left", and "right" are defined based on the drawings, and the shapes and positions of the components are not limited by the terms.

Meanwhile, a clothes treating apparatus according to an embodiment of the disclosure may include a washing machine, a dryer, or a clothes care apparatus. Washing machines are classified into a pulsator type washing machine that generates water streams according to a rotation of a pulsator provided inside a drum and washes laundry by the water streams, and a drum type washing machine that washes laundry by lifting and dropping the laundry by lifters formed on an inner circumferential surface of a drum.

Hereinafter, a drum type washing machine will be described. However, the disclosure is not limited to the drum type washing machine and may also be applied to a pulsator type washing machine, a dryer, a clothes care apparatus, etc.

Hereinafter, an embodiment of the disclosure will be described in detail with reference to the accompanying drawings.

An aspect of the disclosure provides a clothes treating apparatus including a damper with an excellent vibration reduction effect.

Another aspect of the disclosure provides a clothes treating apparatus including a damper that is manufactured with low cost.

According to the disclosure, there is provided a clothes treating apparatus including a damper with an excellent damping force by including a magneto-rheological fluid.

According to the disclosure, there is provided a clothes treating apparatus including a damper that is manufactured with low cost by using a magneto-rheological fluid only at a needed area.

Figure 2:
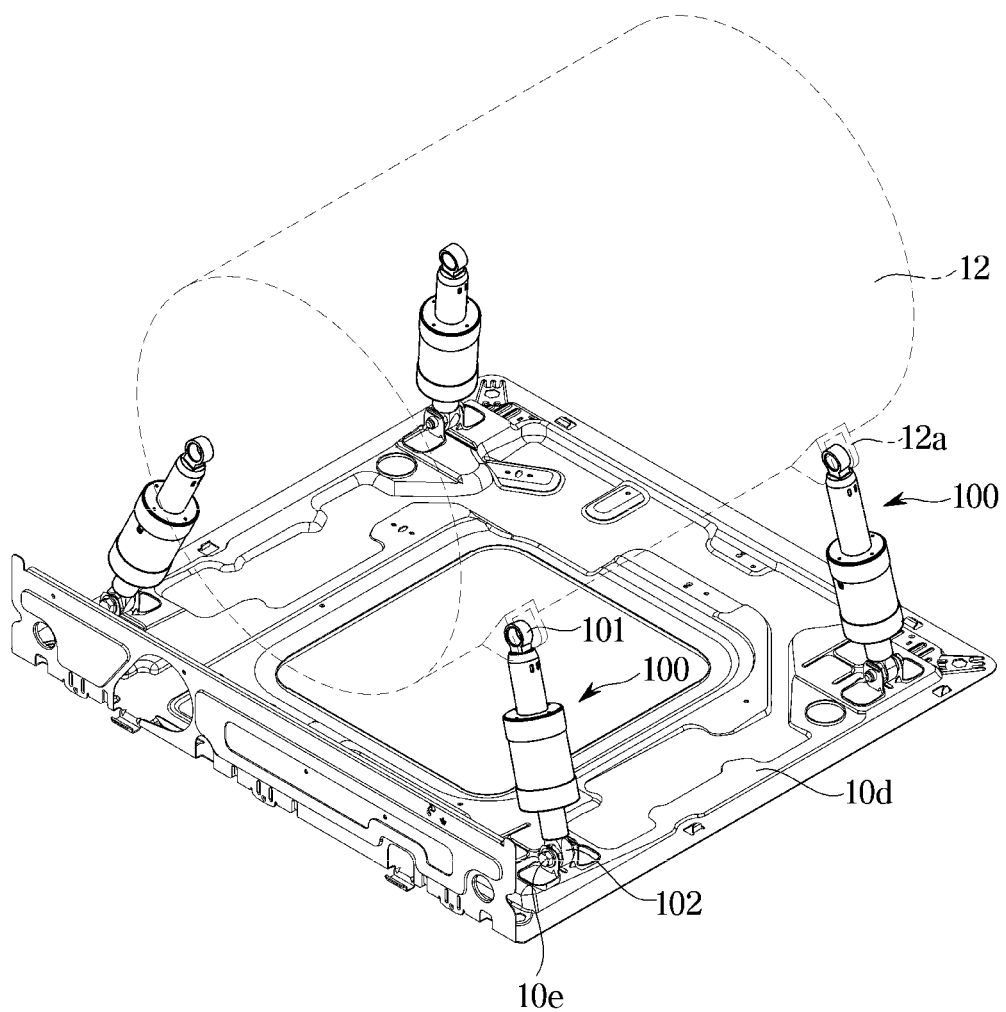
FIG. 2 is a perspective view showing some components of the clothes treating apparatus shown in FIG. 1.

FIG. 1 is a perspective view of a clothes treating apparatus according to an embodiment of the disclosure. FIG. 2 is a perspective view showing some components of the clothes treating apparatus shown in FIG. 1.

Referring to FIGS. 1 and 2, a clothes treating apparatus 1 according to an embodiment of the disclosure may include a washing machine 1. The washing machine 1 may include a cabinet 10 forming an appearance, a tub 12 installed inside the cabinet 10 and storing washing water, and a drum 11 rotatably installed inside the tub 12 and being in the shape of a cylinder, wherein a plurality of dehydrating holes may be formed in a wall of the tub 12. The cabinet 10 may be substantially in the shape of a hexahedron. The cabinet 10 may include a front plate 10a, a rear plate (not shown), both side plates 10b, an upper plate 10c, and a bottom plate 10d forming a bottom. The front plate 10a of the cabinet 10 may be a front panel 10a. In the front plate 10a of the cabinet 10, an opening portion 13 through which laundry is put or taken out may be formed. In the tub 12 and the drum 11, openings through which laundry is put or taken out in a front direction of the cabinet 10 may be formed, and the openings of the tub 12 and the drum 11 may be positioned to correspond to the opening portion 13 of the front plate 10a.

In the opening portion 13 of the cabinet 10, a door 20 for opening or closing the openings of the tub 12 and the drum 11 may be mounted.

A control panel 14 for controlling operations of the washing machine 1 may be provided on an upper portion of the front plate 10a of the cabinet 10. The control panel 14 may be a component included in the front panel 10a.

A driving unit (not shown) may be provided behind the drum 11. The driving unit may be a component for rotating the drum 11, and transfer a driving force generated in a motor to a rotating shaft to rotate the drum 11.

A water supply valve (not shown) for controlling supply of water and a plurality of water supply tubes, which are not shown, may be provided above the tub 12. Also, a detergent supply device 30 for supplying a detergent to inside of the tub 12 while water is supplied may be installed above the tub 12. A drain device (not shown) including a drain tube (not shown), a drain valve (not shown), etc. for draining water stored in the tub 12 may be installed below the tub 12.

The embodiment of the disclosure shows an example of separately providing the front plate 10a, the rear plate, the both side plates 10b, the upper plate 10c, and the bottom plate 10d forming the cabinet 10 and then assembling the front plate 10a, the rear plate, the both side plates 10b, the upper plate 10c, and the bottom plate 10d into one body, however, the disclosure is not limited to this. For example, at least some of the front plate 10a, the rear plate, the both side plates 10b, the upper plate 10c, and the bottom plate 10d of the cabinet 10 may be integrated into one body.

The tub 12 may be elastically supported from the cabinet 10 by a spring (not shown) provided above the tub 12 and a plurality of vibration reduction devices 100 provided below the tub 12. The vibration reduction devices 100 may be referred to as dampers 100. For example, the spring and the dampers 100 may absorb vibration energy between the tub 12 and the cabinet 10 upon transferring of vibrations generated according to a rotation of the drum 11 to the tub 12 and the cabinet 10 to attenuate vibrations to be transferred to the cabinet 10.

A plurality of dampers 100 may be provided to support a lower portion of the tub 12. For example, four dampers 100 may be provided to support the tub 12. The plurality of dampers 100 may prevent shaking and vibrations of the tub 12 generated during a washing operation from being transferred toward the cabinet 10. Each damper 100 may include a first fixing portion 101 formed at an upper end and a second fixing portion 102 formed at a lower end. A damper fixing portion 12a capable of being coupled to the upper end of the damper 100 may be provided on an outer surface of the tub 12. The first fixing portion 101 of the damper 100 may be supported on the damper fixing portion 12a of the tub 12. The damper fixing portion 12a of the tub 12 may be provided to correspond to the first fixing portion 101 of the damper 100. The second fixing portion 102 of the damper 100 may be supported on a damper fixing portion 10e formed on the bottom plate 10d.

In the drawings, the first fixing portion 101 is shown to be positioned at the upper end of the damper 100 and the second fixing portion 102 is shown to be positioned at the lower end of the damper 100, although not limited thereto. For example, the first fixing portion 101 may be provided at the lower end of the damper 100 and the second fixing portion 102 may be provided at the upper end of the damper 100.

Figure 3:
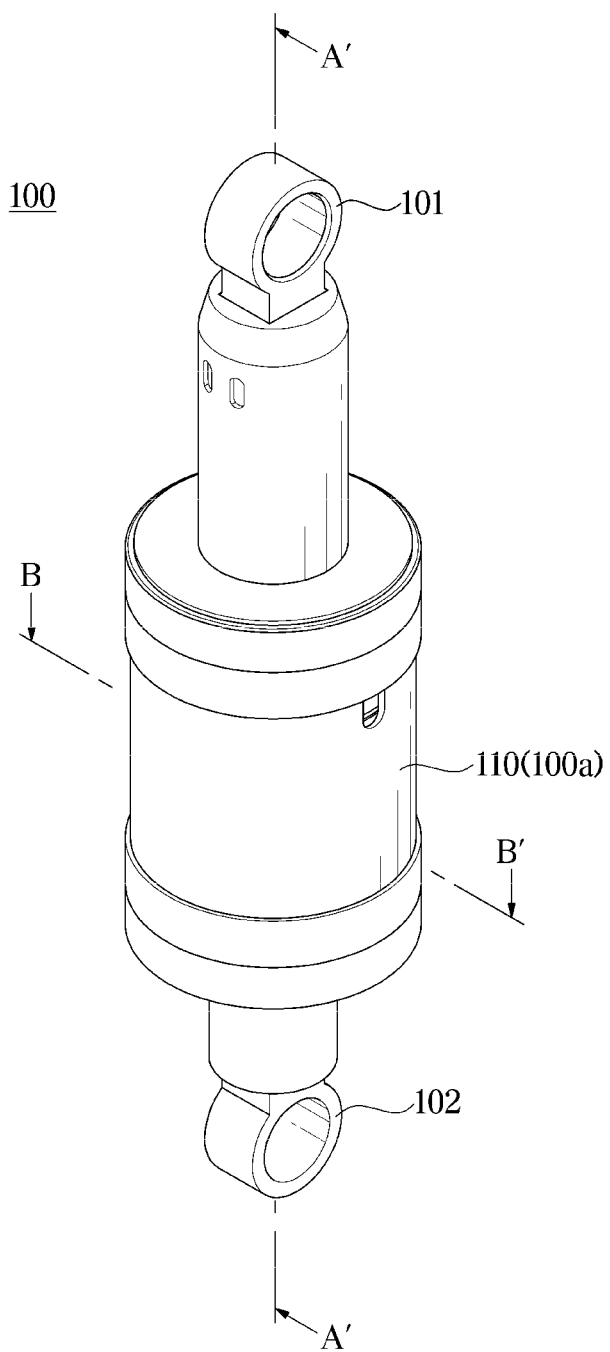
FIG. 3 is a perspective view of a damper in the clothes treating apparatus shown in FIG. 2.
Figure 4:
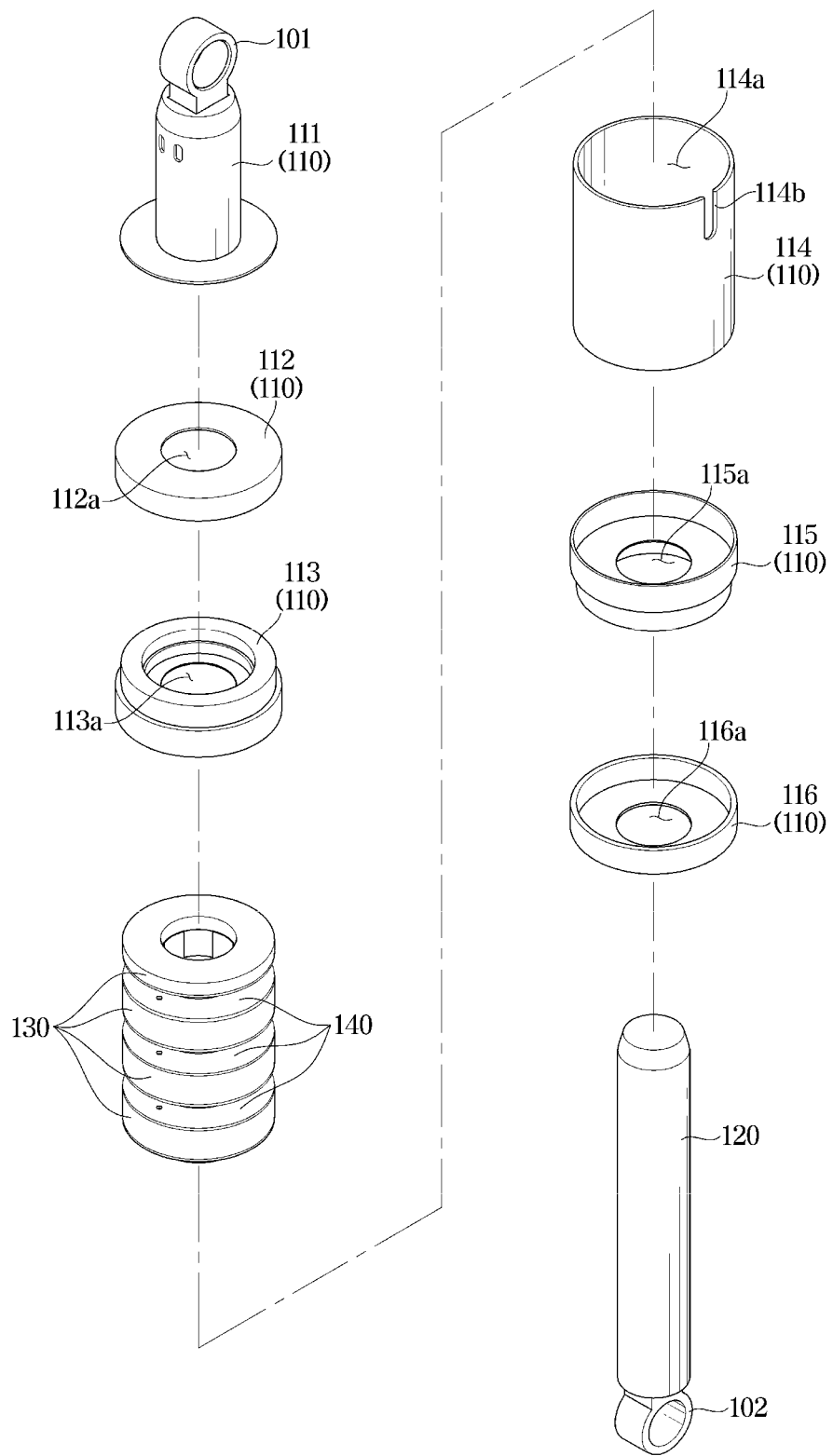
FIG. 4 is an exploded perspective view of the damper shown in FIG. 3.
Figure 5:
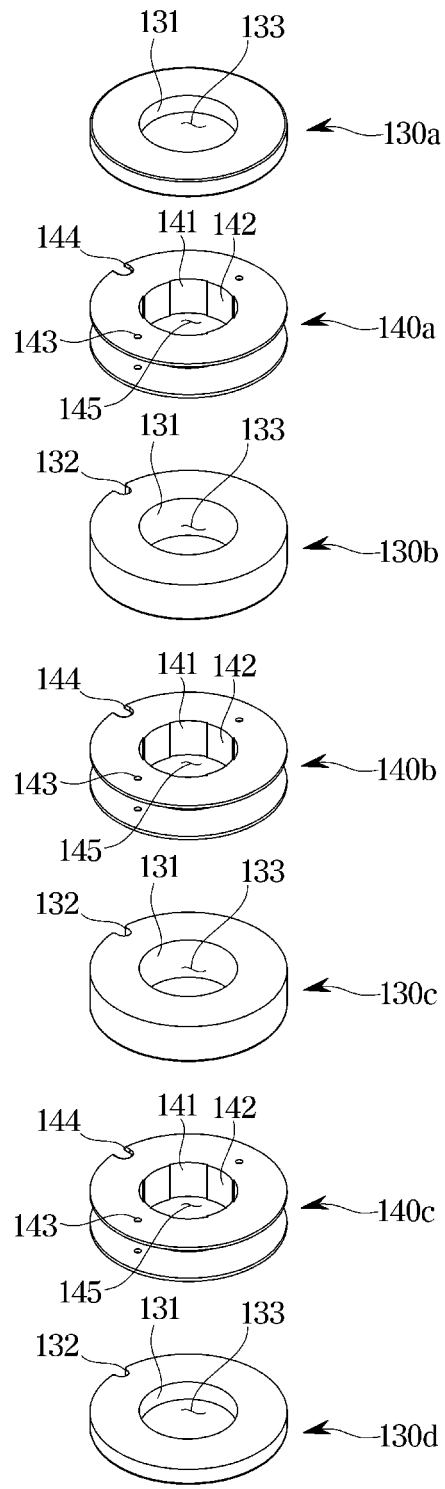
FIG. 5 is an exploded perspective view showing some components of the damper shown in FIG. 4.

FIG. 3 is a perspective view of a damper in the clothes treating apparatus shown in FIG. 2. FIG. 4 is an exploded perspective view of the damper shown in FIG. 3. FIG. 5 is an exploded perspective view showing some components of the damper shown in FIG. 4.

Referring to FIGS. 3 to 5, the washing machine 1 according to an embodiment of the disclosure may include the damper 100. The damper 100 may include a piston 120, a cylinder 100a, and a friction member 160.

The piston 120 may extend in one direction. The piston 120 may be movable inside the cylinder 100a. The piston 120 may be referred to as a rod 120.

For example, vibrations of the tub 12 may be damped by friction between the piston 120 and the cylinder 100a, which is generated by the piston 120 moving back and forth in an inside space 100b of the cylinder 100a.

The second fixing portion 102 may be provided at one end of the piston 120. The second fixing portion 102 may be formed at one end of the piston 120, which is not inserted in the inside space 100b of the cylinder 100a. The second fixing portion 102 may be fixed to the bottom plate 10d, although not limited thereto. However, the second fixing portion 102 may be fixed to the tub 12.

The cylinder 100a may accommodate the piston 120 to enable the piston 120 to move back and forth inside the cylinder 100a. For example, the cylinder 100a may include the inside space 100b. The inside space 100b may be formed inside the cylinder 100a. The cylinder 100a may surround the piston 120.

The cylinder 100a may further include a case 110. The case 110 may form an appearance of the cylinder 100a. The case 110 may be referred to as a cylinder case 110. A plurality of cases 110 may be provided. For example, the plurality of cases 110 may include a first case 111, a second case 112, a third case 113, a fourth case 114, a fifth case 115, and a sixth case 116. The first case 111, the second case 112, the third case 113, the fourth case 114, the fifth case 115, and the sixth case 116 may be coupled to each other by various methods. For example, the first case 111, the second case 112, the third case 113, the fourth case 114, the fifth case 115, and the sixth case 116 may be welded or screwed to each other. Also, by bending a portion of each of the cases 110 and inserting the case 110 into another case 110, the case 110 may be coupled to the other case 110.

In the drawings, the first case 111, the second case 112, the third case 113, the fourth case 114, the fifth case 115, and the sixth case 116 are shown to be separate components, however, the first case 111, the second case 112, the third case 113, the fourth case 114, the fifth case 115, and the sixth case 116 may be integrated into one body.

The first case 111 may be positioned at one end of the cylinder case 110. The first case 111 may be coupled to the second case 112. The first fixing portion 101 may be formed at one end of the first case 111. The first case 111 may accommodate a portion of the piston 120 therein.

The second case 112 may be coupled to the first case 111. The second case 112 may cover the third case 113 and a portion of the piston 120. For example, the piston 120 may penetrate a cavity 112a of the second case 112. The third case 113 may be coupled to the second case 112 and the fourth case 114. The third case 113 may cover a portion of the piston 120, and accommodate a sealing member 170. For example, the piston 120 may penetrate the cavity 113a of the third case 113.

The fourth case 114 may be coupled to the second case 112 or the fifth case 115.

The fourth case 114 may include an accommodating space 114a and a guide hole 114b.

The fourth case 114 may include a bobbin 140, a yoke 130, and the piston 120. The bobbin 140, the yoke 130, and the piston 120 may be accommodated in the accommodating space 114a. Because a coil 150 is wound on the bobbin 140 which will be described below, the guide hole 114b may guide the coil 150. The guide hole 114b may extend from one end of a wall of the fourth case 114.

The fifth case 115 may be coupled to the fourth case 114 and the sixth case 116. The fifth case 115 may cover a portion of the piston 120, and accommodate the sealing member 170. For example, the piston 120 may penetrate a cavity 115a of the fifth case 115.

The sixth case 116 may be positioned at another end of the cylinder case 110.

The sixth case 116 may be coupled to the fifth case 115. The sixth case 116 may accommodate a portion of the piston 120 therein. For example, the piston 120 may penetrate a cavity 116a of the sixth case 116.

The cylinder 100a may further include the yoke 130 and the bobbin 140.

The yoke 130 may interwork with a friction member 160 including a magneto-rheological fluid which will be described below. Due to interworking between the yoke 130 and the magneto-rheological fluid, a friction may be generated between the cylinder 100 and the piston 120. For example, the yoke 130 may be a magnetic body. The yoke 130 may have a cavity forming the inside space 100b of the cylinder 100a. For example, the yoke 130 may include a cavity 133. The cavity 133 may be formed by an inner surface 131. The cavity 133 may be referred to as an inside space 133 of the yoke 130. For example, the inside space 100b of the cylinder 100a may include the cavity 133 of the yoke 130. The piston 120 may be accommodated and/or inserted in the cavity 133. A plurality of yokes 130 may be provided. The plurality of yokes 130 may include a first yoke 130a, a second yoke 130b, a third yoke 130c, and a fourth yoke 130d. The bobbin 140 may be positioned between the plurality of yokes 130. For example, a first bobbin 140a may be positioned between the first yoke 130a and the second yoke 130b, a second bobbin 140b may be positioned between the second yoke 130b and the third yoke 130c, and a third bobbin 140c may be positioned between the third yoke 130c and the fourth yoke 130d.

The yoke 130 may further include a coil guide 132 and a coupling protrusion (not shown). The coil guide 132 may guide the coil 150 that is wound on the bobbin 140. The coil guide 132 may be depressed inward along a radial direction of the yoke 130 and/or the cylinder 100a from an outer circumferential surface of the yoke 130. The coupling protrusion may couple the yoke 130 to the bobbin 140. For example, the bobbin 130 may be coupled to the yoke 130 by a coupling portion formed in the bobbin 140 and the coupling protrusion formed in the yoke 130. In the drawings, the coil guide 132 is shown to be positioned only in the second yoke 130b and the third yoke 130c. However, a location of the coil guide 132 is not limited to this. Also, the coil guide 132 and the coupling protrusion may be selective components. For example, the coil guide 132 and the coupling protrusion may be omitted.

The bobbin 140 may be positioned between the plurality of yokes 130 to space the plurality of yokes 130 from each other. The coil 150 may be wound on the bobbin 140. For example, the coil 150 may be wound on an extension portion 147 of the bobbin 140 (see FIG. 6). The bobbin 140 may be a nonmagnetic body. For example, the bobbin 140 may be a plastic injection mold.

The bobbin 140 may have a cavity to form the inside space 100b of the cylinder 100a. For example, the bobbin 140 may include a cavity 145. The cavity 145 may be formed by an inner surface 141. The cavity 145 may be referred to as an inside space 145 of the bobbin 140. For example, the inside space 100b of the cylinder 100a may include the cavity 145 of the bobbin 140. The piston 120 may be accommodated and/or inserted in the cavity 145. A plurality of bobbins 140 may be provided. The plurality of bobbins 140 may include a first bobbin 140a, a second bobbin 140b, and a third bobbin 140c. The plurality of bobbins 140 may be respectively positioned between the plurality of yokes 130.

The bobbin 140 may further include a radial protrusion 142. The radial protrusion 142 may protrude along a radial direction from the inner surface 141 forming the cavity 145 of the bobbin 140. The radial protrusion 142 may protrude toward a center of the cavity 145. Due to the radial protrusion 142, a smaller portion of the friction member 160 may be accommodated in an area where the radial protrusion 142 is formed between the inner surface 141 of the bobbin 140 and the piston 120, than in an area where no radial protrusion 142 is formed between the inner surface 141 of the bobbin 140 and the piston 120. Details about this will be described below.

The bobbin 140 may further include a coil guide 144. The coil guide 144 may guide the coil 150 that is wound on an outer circumference of the extension portion 147. The coil guide 144 may be depressed inward along a radial direction of the bobbin 140 and/or the cylinder 100a from an outer circumferential surface of the support plate 146 (see FIG. 6).

The bobbin 140 may further include a coupling portion. The coupling portion may couple the bobbin 140 to the yoke 130. For example, the bobbin 140 may be coupled to the yoke 130 by the coupling portion formed in the bobbin 140 and the coupling protrusion formed in the yoke 130. For example, the bobbin 140 may be formed as a through hole or a groove.

The radial protrusion 142, the coil guide 144, and the coupling portion may be selective components. For example, the radial protrusion 142, the coil guide 144, and the coupling portion may be omitted. The friction member 160 may include a magneto-rheological fluid. Details about this will be described below.

Figure 6:
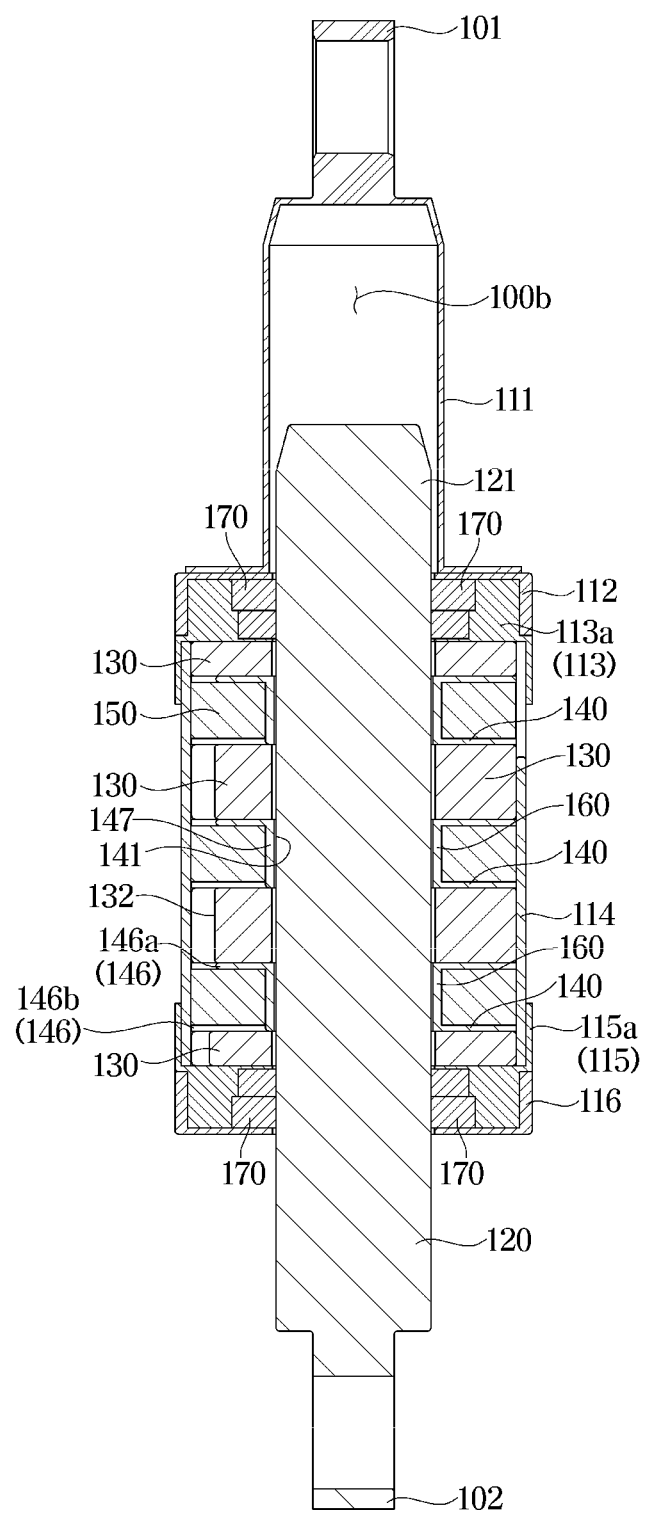
FIG. 6 is a cross-sectional view of the damper shown in FIG. 3.
Figure 7:
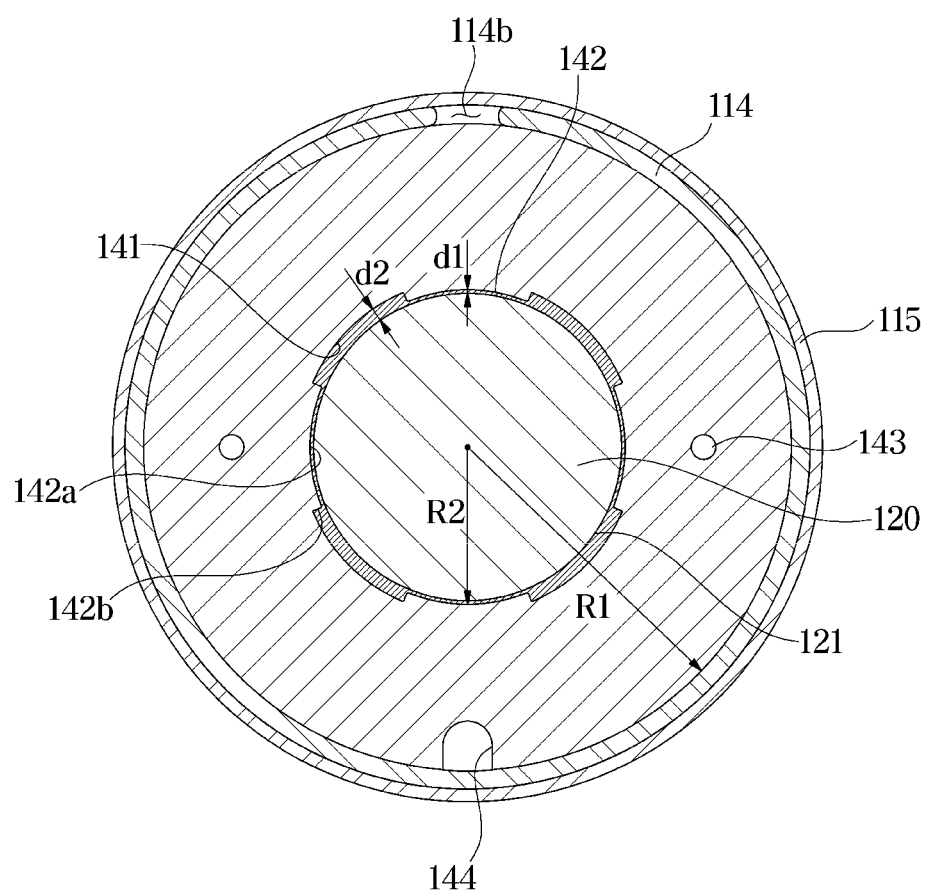
FIG. 7 is a cross-sectional view of the damper shown in FIG. 3.

FIG. 6 is a cross-sectional view of the damper shown in FIG. 3. FIG. 7 is a cross-sectional view of the damper shown in FIG. 3.

Referring to FIGS. 6 and 7, the clothes treating apparatus 1 according to an embodiment of the disclosure may include the damper 100. The damper 100 may include the cylinder 100a, the piston 120, the coil 150, and the friction member 160.

The cylinder 100a may include the bobbin 140 and the yoke 130. The bobbin 140 may include the support plate 146, the extension portion 147, and the radial protrusion 142.

The support plate 146 may be positioned between the plurality of yokes 130 to support the plurality of yokes 130. For example, a plurality of support plates 146 may be provided. For example, a first support plate 146a may be in contact with the yoke 130 positioned at one side of the bobbin 140 along a longitudinal direction (and/or an extension direction) of the piston 120 to support the yoke 130, and a second support plate 146b may be in contact with the yoke 130 positioned at another side of the bobbin 140 along the longitudinal direction of the piston 120 to support the yoke 130. The support plate 146 may be referred to as a contact plate 146.

The extension portion 147 may be positioned between the plurality of support plates 146. For example, the extension portion 147 may be positioned between the first support plate 146a and the second support plate 146b to extend along the longitudinal direction (and/or the extension direction) of the piston 120. A radius R2 of the extension portion 147 may be smaller than a radius R1 of the support plate 146. For example, the extension portion 147 may connect center portions of the plurality of support plates 146 to each other. The coil 150 may be wound on the circumferential surface of the extension portion 147.

The radial protrusion 142 may protrude from the inner surface 141 of the bobbin 140 toward the piston 120. For example, the radial protrusion 142 may protrude from the inner surface 141 of the bobbin 140 toward the cavity 145 along the radial direction of the bobbin 140.

A plurality of radial protrusions 142 may be provided. The plurality of radial protrusions 142 may protrude in a direction of facing each other, although not limited thereto. However, the plurality of radial protrusions 142 may protrude without facing each other.

Each radial protrusion 142 may include a protrusion surface 142a and a connecting surface 142b. The protrusion surface 142a may protrude from the inner surface 141 of the bobbin 140. For example, the protrusion surface 142a may have a step with respect to the inner surface 141 of the bobbin 140. The connecting surface 142b may connect the protrusion surface 142a to the inner surface 141 of the bobbin 140. The connecting surface 142b may be provided at both sides of the protrusion surface 142a.

The coil 150 may surround an outer circumference of the bobbin 140. For example, the coil 150 may surround the extension portion 147. The coil 150 may be positioned between the plurality of support plates 146. According to application of current to the coil 150, a magnetic field may be formed, and viscosity and a friction force of the friction member 160 including the magneto-rheological fluid may change.

The friction member 160 may be positioned between the cylinder 100a and the piston 120 to reduce vibrations generated according to a rotation of the drum 11 during an operation of the washing machine through a friction force between the cylinder 100a and the piston 120. For example, the friction member 160 may be positioned between the outer surface 121 of the piston 120 and the inner surface of the cylinder 100a. The friction member 160 may include a magneto-rheological fluid.

By current flowing through the coil 150 wound on the bobbin 140, a magnetic field may be generated, and viscosity of the magneto-rheological fluid may change by the magnetic field. For example, while the drum 11 rotates at low speed, current may be applied to the coil 150 to increase viscosity of the magneto-rheological fluid, and accordingly, a friction force applied to the friction member 160 may increase. In contrast, while the drum 11 rotates at high speed, no current may be applied to the coil 150 to decrease viscosity of the magneto-rheological fluid, and accordingly, a friction force applied to the friction member 160 may decrease.

However, although viscosity of the magneto-rheological fluid changes in an area where a magnetic field is formed by the coil 150, the viscosity of the magneto-rheological fluid may not change in an area where no magnetic field is formed, which may have no influence on a change of a friction force. Accordingly, a large portion of the friction member 160 including a magneto-rheological fluid may be positioned in an area where a magnetic field is formed, and a small portion of the friction member 160 including a magneto-rheological fluid may be positioned in an area where no magnetic field is formed.

The friction member 160 may be positioned between the protrusion surface 142a and the outer surface 121 of the piston 120 and/or between the inner surface 141 of the bobbin 140 and the outer surface 121 of the piston 120. For example, a portion of the friction member 160 may be positioned between the protrusion surface 142a and the outer surface 121 of the piston 120, and another portion of the friction member 160 may be positioned between the inner surface 141 of the bobbin 140 and the outer surface 121 of the piston 120. In this case, a magnetic field may be mostly generated between the yoke 130 and the piston 120. Accordingly, in an area between the bobbin 140 and the piston 120, corresponding to an area where no magnetic field is formed or a small magnetic field is formed, a small portion of the friction member 160 including the magneto-rheological fluid may be positioned. For example, a portion of the friction member 160 positioned between the protrusion surface 142a and the outer surface 121 of the piston 120 may be smaller than another portion of the friction member 160 positioned between the inner surface 141 of the bobbin 140 and the outer surface 121 of the piston 120. Also, a ratio of a length and/or a thickness between the protrusion surface 142a and the outer surface 121 of the piston 120 and a length and/or a thickness between the inner surface 141 of the bobbin 140 and the outer surface 121 of the piston 120 may be 1:2.4. However, the ratio is not limited.

Accordingly, it may be possible to reduce an amount of the friction member 160 including the magneto-rheological fluid while maintaining the same damping force. Because the magneto-rheological fluid has a high cost, a production cost and/or a manufacturing cost of the damper 100 may be reduced, resulting in a reduction of a production cost and/or a manufacturing cost of the clothes treating apparatus 1.

The damper 100 may further include a sealing member 170. The sealing member 170 may be accommodated in the case 110. The sealing member 170 may seal a space between the piston 120 and the cylinder 100a. For example, the sealing member 170 may be positioned between the piston 120 and the third case 113 and/or between the piston 120 and the fifth case 115. A plurality of sealing members 170 may be provided.

Figure 8:
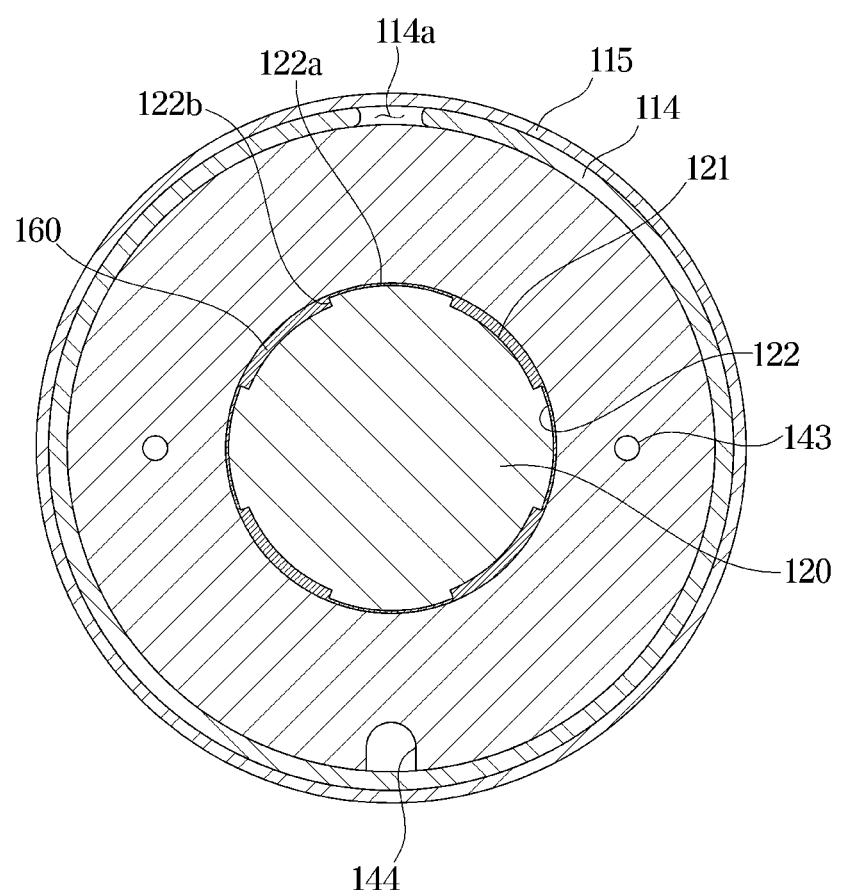
FIG. 8 is a cross-sectional view of a damper in a clothes treating apparatus according to an embodiment of the disclosure.

FIG. 8 is a cross-sectional view of a damper in a clothes treating apparatus according to an embodiment of the disclosure.

Referring to FIG. 8, the damper 100 according to an embodiment of the disclosure may include the piston 120, the cylinder 100a, and the friction member 160. The piston 120 may include a radial protrusion 122. The cylinder 100a may include the bobbin 140.

The radial protrusion 122 may protrude from the piston 120 toward the bobbin 140. For example, the radial protrusion 122 may protrude from the outer surface 121 of the piston 120 toward the inner surface 141 of the bobbin 140 along the radial direction of the piston 120. A plurality of radial protrusions 122 may be provided. The plurality of radial protrusions 122 may protrude in opposite directions, although not limited thereto.

The radial protrusion 122 may include a protrusion surface 122a and a connecting surface 122b. The protrusion surface 122a may protrude from the outer surface 121 of the piston 120. For example, the protrusion surface 122a may have a step with respect to the outer surface 121 of the piston 120. The connecting surface 122b may connect the protrusion surface 122a to the outer surface 121 of the piston 120. The connecting surface 122b may be provided at both sides of the protrusion surface 122a.

The friction member 160 may be positioned between the cylinder 100a and the piston 120 to reduce vibrations generated according to a rotation of the drum 11 during an operation of the washing machine through a friction force between the cylinder 100a and the piston 120. For example, the friction member 160 may be positioned between the outer surface 121 of the piston 120 and the inner surface of the cylinder 100a. The friction member 160 may be positioned between the protrusion surface 122a and the inner surface 141 of the bobbin 140 and/or between the outer surface 121 of the piston 120 and the inner surface 141 of the bobbin 140. For example, a portion of the friction member 160 may be positioned between the protrusion surface 122a and the inner surface 141 of the bobbin 140, and another portion of the friction member 160 may be positioned between the inner surface 141 of the bobbin 140 and the outer surface 121 of the piston 120. In this case, a small portion of the friction member 160 including the magneto-rheological fluid may be positioned in an area where no magnetic field is formed or a small magnetic field is formed between the bobbin 140 and the piston 120. For example, a portion of the friction member 160 positioned between the protrusion surface 122a and the inner surface 141 of the bobbin 140 may be smaller than another portion of the friction member 160 positioned between the inner surface 141 of the bobbin 140 and the outer surface 121 of the piston 120. Also, for example, a length and/or a thickness between the protrusion surface 122a and the inner surface 141 of the bobbin 140 may be smaller than a length and/or a thickness between the inner surface 141 of the bobbin 140 and the outer surface 121 of the piston 120.

Accordingly, it may be possible to reduce an amount of the friction member 160 including the magneto-rheological fluid while maintaining the same damping force. Because the magneto-rheological fluid has a high cost, a production cost and/or a manufacturing cost of the damper 100 may be reduced, resulting in a reduction of a production cost and/or a manufacturing cost of the clothes treating apparatus 1.

Figure 9:
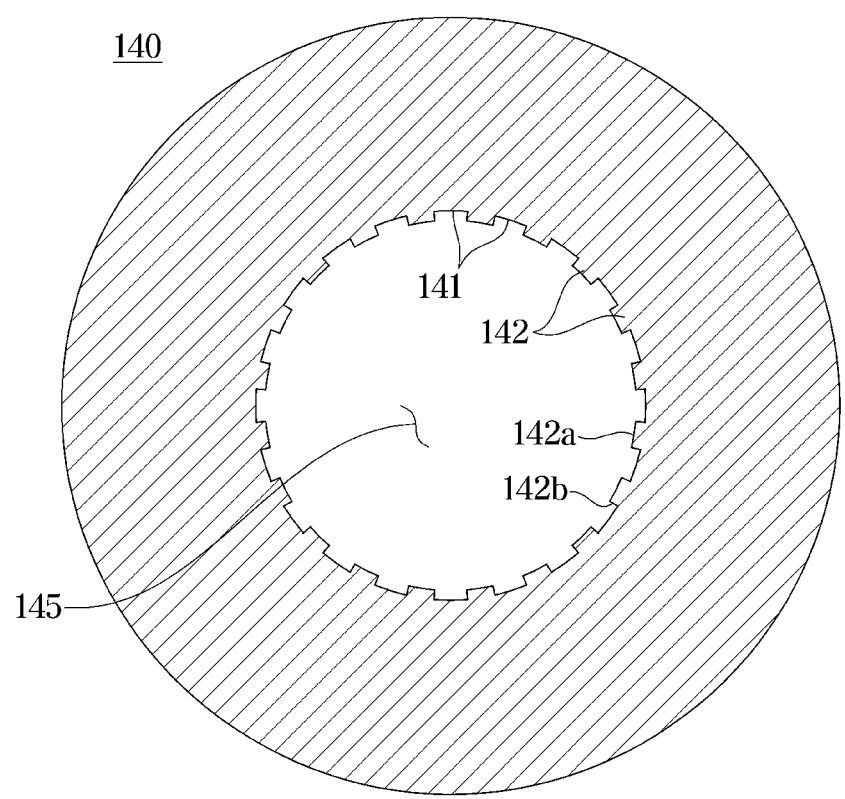
FIG. 9 is a cross-sectional view of a damper in a clothes treating apparatus according to an embodiment of the disclosure.

FIG. 9 is a cross-sectional view of a damper in a clothes treating apparatus according to an embodiment of the disclosure.

Referring to FIG. 9, the damper 100 according to an embodiment of the disclosure may include the bobbin 140. The bobbin 140 may include a plurality of radial protrusions 142. In FIG. 7, four radial protrusions 142 are shown, however, a number of the radial protrusions 142 is not limited to four. By increasing the number of the radial protrusions 142, it may be possible to maintain the same damping force while reducing an amount of the friction member 160 positioned between the piston 120 and the bobbin 140.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

What is claimed is:

1. A clothes treating apparatus comprising:
   a cabinet;
   a tub positioned inside the cabinet;
   a drum configured to rotate inside the tub; and
   a damper coupled to the cabinet and the tub and configured to reduce vibrations of the tub during a rotation of the drum,
   wherein the damper comprises:
      a piston;
      a cylinder including an inside space in which the piston is movable in the inside space, the cylinder including:
         a yoke;
         a bobbin positioned at one side of the yoke; and
         a radial protrusion protruding from an inner surface of the bobbin forming the inside space, and positioned between the piston and the cylinder; and
      a friction member positioned between an outer surface of the piston and an inner surface of the cylinder and accommodated in the inside space formed by the radial protrusion, the friction member including a magneto-rheological fluid of which viscosity changes according to a magnetic field, and
   wherein a thickness of the friction member positioned between the piston and the bobbin is smaller than a thickness of the friction member positioned between the piston and the yoke.

2. The clothes treating apparatus of claim 1, wherein the cylinder comprises a plurality of radial protrusions and the radial protrusion is one of the plurality of radial protrusions, and a portion of the friction member is positioned between the plurality of radial protrusions, and an other portion of the friction member is positioned between the inner surface of the bobbin and an outer surface of the piston.

3. The clothes treating apparatus of claim 2, wherein each of the plurality of radial protrusions comprises:
a protrusion surface extending toward the outer surface of the piston; and
a connecting surface connecting the protrusion surface to the inner surface of the bobbin.

4. The clothes treating apparatus of claim 3, wherein a ratio between a thickness of a portion of the friction member accommodated between the protrusion surface and the outer surface of the piston and a thickness of an other portion of the friction member accommodated between the inner surface of the bobbin and the outer surface of the piston is 1:2.4.

5. The clothes treating apparatus of claim 2, wherein the cylinder further comprises the yoke, and a case accommodating the bobbin.

6. The clothes treating apparatus of claim 5, wherein the bobbin further comprises:
a support plate extending in a radial direction of the bobbin to be in contact with the yoke; and
an extension portion extending from the support plate along a longitudinal direction of the piston, and
wherein the plurality of radial protrusions are formed on the extension portion.

7. The clothes treating apparatus of claim 6, wherein a radius length of the extension portion is smaller than a radius length of the plurality of support plates, and the damper further comprises a coil configured to surround an outer circumference of the extension portion and interwork with the friction member including the magneto-rheological fluid.

8. The clothes treating apparatus of claim 7, wherein the plurality of radial protrusions comprises:
a first radial protrusion protruding from the inner surface of the bobbin along one direction; and
a second radial protrusion protruding from the inner surface of the bobbin along a second direction that is opposite to the one direction.

9. The clothes treating apparatus of claim 1, wherein the piston comprises a radial protrusion protruding from the outer surface of the piston toward the inner surface of the bobbin.

10. The clothes treating apparatus of claim 9, wherein the piston comprises a plurality of radial protrusions and the radial protrusion is one of the plurality of radial protrusions, and
a portion of the friction member is positioned between the plurality of radial protrusions, and an other portion of the friction member is positioned between the inner surface of the bobbin and the outer surface of the piston.

11. The clothes treating apparatus of claim 10, wherein each of the plurality of radial protrusions comprises:
a protrusion surface extending toward the inner surface of the bobbin; and
a connecting surface connecting the protrusion surface to the outer surface of the piston.

12. The clothes treating apparatus of claim 10, wherein the bobbin further comprises:
a support plate extending in a radial direction of the bobbin to be in contact with the yoke; and
an extension portion extending from the support plate along a longitudinal direction of the piston,
wherein a radius length of the extension portion is smaller than a radius length of the support plate, and the damper further comprises a coil configured to surround an outer circumference of the extension portion and interwork with the friction member including the magneto-rheological fluid.

13. The clothes treating apparatus of claim 12, wherein each of the radial protrusions comprises:
a first radial protrusion protruding from the outer surface of the piston along one direction; and
a second radial protrusion protruding from the outer surface of the piston along a direction that is opposite to the one direction.

14. A clothes treating apparatus comprising:
a cabinet;
a tub positioned inside the cabinet;
a drum configured to rotate inside the tub; and
a damper coupled to the cabinet and the tub and configured to reduce vibrations of the tub during a rotation of the drum, the damper including:
a piston;
a cylinder including:
an inside space in which the piston is movable in the inside space; and
a radial protrusion protruding from an inner surface forming the inside space, and positioned between the piston and the cylinder; and
a friction member positioned between an outer surface of the piston and an inner surface of the cylinder, and accommodated in the inside space formed by the radial protrusion, the friction member including a magneto-rheological fluid of which viscosity changes according to a magnetic field,
wherein a thickness of a portion of the friction member positioned between the radial protrusion and the outer surface of the piston is smaller than a thickness of an other portion of the friction member positioned between the inner surface of the cylinder and the outer surface of the piston on which no radial protrusion is formed.

15. A clothes treating apparatus comprising:
a cabinet;
a tub positioned inside the cabinet;
a drum configured to rotate inside the tub; and
a damper coupled to the cabinet and the tub and configured to reduce vibrations of the tub during a rotation of the drum, the damper including:
a cylinder including:
an inside space;
a yoke; and
a bobbin positioned at one side of the yoke;
a piston movable in the inside space and including a radial protrusion protruding from an outer surface of the piston toward an inner surface of the bobbin; and
a friction member positioned between the outer surface of the piston and an inner surface of the cylinder, and accommodated in the inside space, the friction member including a magneto-rheological fluid of which viscosity changes according to a magnetic field,
wherein a thickness of a portion of the friction member positioned between the radial protrusion and the inner surface of the bobbin is smaller than a thickness of an other portion of the friction member positioned between the inner surface of the bobbin and the outer surface of the piston on which no radial protrusion is formed.

* * * * *